United States Patent [19]

Zanno et al.

[11] Patent Number: 4,493,852
[45] Date of Patent: Jan. 15, 1985

[54] 1,1-BIS (THIOALKYL) ALKYL-2,4-DIENE AS A FLAVORING AGENT

[75] Inventors: Paul R. Zanno, Hopewell Junction; Thomas H. Parliment, New City; Robert J. Soukup, New City; Richard P. McNaught, New City, all of N.Y.

[73] Assignee: General Foods Corporation, White Plains, N.Y.

[21] Appl. No.: 602,095

[22] Filed: Apr. 20, 1984

Related U.S. Application Data

[63] Continuation of Ser. No. 304,394, Sep. 21, 1981, abandoned.

[51] Int. Cl.$^3$ .............................................. A23L 1/231
[52] U.S. Cl. ...................................... 426/535; 568/57
[58] Field of Search ................... 426/535, 533; 568/57

[56] References Cited

U.S. PATENT DOCUMENTS 2,594,379 4/1952 Barch .............................. 426/535 X
3,258,493 6/1966 Braus et al. ........................... 568/57
3,509,182 4/1970 Hopkins et al. ................... 568/57 X
3,852,481 12/1974 Feldman et al. ..................... 426/533

Primary Examiner—Joseph Golian
Attorney, Agent, or Firm—Joseph T. Harcarik; Thomas R. Savoie; Daniel J. Donovan

[57] ABSTRACT

A flavoring composition comprising an effective amount of a compound having the following structure:

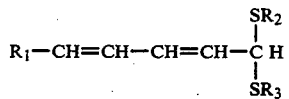

wherein $R_1$ is an alkyl group of 1 to 7 carbon atoms; and $R_2$ and $R_3$ are chosen from the group consisting of hydrogen and an alkyl group of 1 to 3 carbon atoms. These compounds have been found to impart a fatty, meaty, chicken-like and pork-like quality, flavor and aroma when added in effect amounts to food products.

6 Claims, No Drawings

1,1-BIS (THIOALKYL) ALKYL-2,4-DIENE AS A FLAVORING AGENT

This application is a continuation of application Ser. No. 304,394, filed 9/21/81, now abandoned.

BACKGROUND OF THE INVENTION

This invention relates to a composition which imparts or enhances the flavor of foodstuffs. More particularly a flavoring composition has been discovered which imparts or enhances the meaty, chicken-like, fatty and pork-like flavor, aroma and character of foodstuffs. A process is also disclosed for preparing the flavoring composition.

Food products enhanced with poultry-like or pork-like flavors are known in the art and have long been used. There is considerable demand for these flavors in which the actual pork or poultry meat is not needed or is actually undesirable. For example, in the preparation of some sauces and purees a poultry or pork flavor is desired, but it is necessary to cook the food with the desired meat and then remove the meat by straining it, or some similar operation to obtain the final product ready for use. While this method for preparing a flavored sauce of puree is effective it is time consuming and expensive.

Additionally, where weight, space and/or storage capability are a problem, e.g. when a convenience food is prepared, the presence of the actual meat may be undesirable because it will deteriorate in storage and spoil the food. Moreover, there are occasions when sterilizing or otherwise preserving the natural product is extremely deleterious to the flavor of the natural material and the desired natural flavor is lost.

Thus, it is a feature of this invention to provide a flavoring composition which can be incorporated in a wide range of foodstuffs.

It is a further feature of this invention to provide a process for preparing the flavoring composition.

SUMMARY OF THE INVENTION

Briefly, this invention involves adding as a flavoring composition an effective amount of a flavoring compound having the following structure:

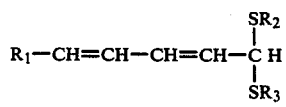

wherein $R_1$ is an alkyl group of 1 to 7 carbon atoms; and $R_2$ and $R_3$ are chosen from the group consisting of an alkyl group of 1 to 3 carbon atoms. The bis(thioalkyl) compound is prepared by reacting aliphatic polyene aldehydes with alkyl thiols with the reaction rate being increased by use of appropriate organic solvents and catalysts.

DETAILED DESCRIPTION OF THE INVENTION

This invention is directed to a flavoring composition which enhances or imparts unique flavor characteristics in foods. The flavoring composition comprises use of an effective amount of the compound 1,1-bis(thioalkyl)alkyl-2,4-diene and has the following structure:

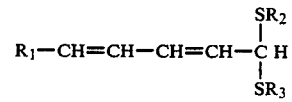

wherein $R_1$ is an alkyl group of 1 to 7 carbon atoms; and $R_2$ and $R_3$ are chosen from the group consisting of an alkyl group of 1 to 3 carbon atoms. Preferably, $R_1$ is a butyl or pentyl group and $R_2$ and $R_3$ are methyl group. $R_2$ and $R_3$ can be different groups although preferably they are identical. When the compounds have alkyl groups with higher chain lengths than 7 carbon atoms for $R_1$, or higher than 3 carbon atoms for $R_2$ and $R_3$, the resultant compounds do not have the desired flavor, aroma and character. Within the above structure the flavoring composition of this invention includes, but is not limited to, the following flavoring compounds: 1,1-bis(thiomethyl)nona-2,4-diene; 1,1-bis(thiomethyl)deca-2,4-diene; 1,1-bis(thioethyl)nona-2,4-diene; 1,1-bis(thiopropyl)deca-2,4-diene; and 1-thiomethyl-1-thioethyl-octa-2,4-diene.

The flavoring composition of this invention imparts a fatty, meaty, chicken-like, pork-like quality, flavor, aroma and character, with some of the compounds imparting a green, vegetable-like character when added in effective amounts to a food product. The type of flavor may vary slightly depending upon the amount of the flavoring composition employed, with higher amounts generally imparting a more pork, fatty flavor and the lower amounts imparting a meaty, chickeny flavor. The flavoring composition can be effectively incorporated in any one of a number of foodstuffs such as sauces, gravies, seasonings, stuffing mixes, soups, meats (including meat analogs and pet foods), or beverages. The level at which the flavoring compound is effective in foodstuffs in generally within the range of 0.1 to 100 parts per million, preferably 1 to 25 parts per million of the foodstuff.

To prepare the flavoring composition aliphatic polyene aldehydes react with alkyl thiols when mixed together to form 1,1-bis(thioalkyl)alkyl-2,4-dienes. The rate of reaction of these compounds can be increased by using an appropriate organic solvent ($CHCl_3$, $CH_2Cl_2$, ethyl ether) and $BF_3$, Lewis acids ($AlCl_3$, etc.) or mineral acids (HCl, etc.) as a catalyst.

The flavoring composition containing the bis(thioalkyl) compound of this invention can be combined with other natural or synthetic flavors to provide a balanced flavor depending upon the desired end use. The flavoring composition can also be fixed on or in a carrier to provide a dry flowable form by common methods, such as by spray or freeze drying the flavoring composition with a carrier such as dextrin, gum arabic, etc.

EXAMPLE 1

To a cooled (0° C.) solution of 25 ml. nona-2,4-dienal in 100 ml. of $CHCl_3$ was added 25 ml of methyl mercaptan. To this solution (at 0° C.) was then added 0.5 ml. of $BF_3$: etherate. The mixture was allowed to come to room temperature, then stirred for 1 hour. After this time the mixture was distilled under vacuum giving 15 gm of 1,1 bis(thiomethyl)nona-2,4 diene.

EXAMPLE 2

To a cooled (0° C.) solution of 25 ml. of deca-2,4-dienal in 100 ml. of $CHCl_3$ was added 25 ml. of methyl mercaptan. To this solution (at 0° F.) was then added 0.5 ml of BF$_3$: etherate. The mixture was allowed to come to RT then stirred for 1 hour. After this time the mixture was distilled under vacuum giving 12.5 gm of 1,1 bis(thiomethyl)deca-2,4-diene.

EXAMPLE 3

The flavoring composition 1,1-bis(thiomethyl)deca-2,4-diene was incorporated into the following foodstuffs and at the following levels with the resultant flavor and aroma:

| Foodstuff | Level of Flavoring Composition | Observed Flavor |
| --- | --- | --- |
| Oriental Noodles (hydrated dry mix) | 6.6 ppm | meaty, pork-like soup flavor |
| | 9.9 ppm | more pork-like flavor, chicken-like, slightly fatty |
| Beef Rice Mix (hydrated dry mix) | 20 ppm | more savory, fatty, meaty flavor |
| Meatless Chow Mein (canned) | 10 ppm | more savory meaty flavor |

EXAMPLE 4

The compound 1,1-bis(thiomethyl)alkyl-2,4-diene with the following structure:

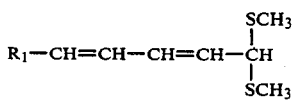

was evaluated for organoleptic properties varying the R$_1$ substituent with the following results:

| R$_1$ | Organoleptic Evaluation |
| --- | --- |
| CH$_3$ | Green/Fatty/Oily/Fried |
| CH$_3$CH$_2$ | Green/Vegetable-like |
| CH$_3$(CH$_2$)$_3$ | Chicken-like/Pork-like/Brothy/Fatty |
| CH$_3$(CH$_2$)$_4$ | Chicken-like/Pork-like/Brothy/Fatty |
| CH$_3$(CH$_2$)$_5$ | Weak Fatty/Oily |

What is claimed is:

1. A foodstuff selected from a group consisting of soup, meat and stuffing mix comprising an amount of a flavoring compound within the range of 0.1 to 100 part ppm of the foodstuff, said flavoring compound having the following structure:

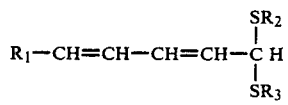

wherein R$_1$ is an alkyl group of 1 to 7 carbon atoms; and R$_2$ and R$_3$ are an alkyl group of 1 to 3 carbon atoms.

2. Foodstuff of claim 1 wherein R$_1$ is chosen from the group consisting of a butyl group and a pentyl group.

3. Foodstuff of claim 1 wherein the amount of the flavoring composition is within the range of 1 to 25 ppm of the foodstuff.

4. Foodstuff of claim 1 further comprising other natural or synthetic flavors.

5. Foodstuff of claim 1 wherein the flavor compound is fixed on a carrier wherein said carrier is selected from a group consisting of dextrose and gum.

6. Foodstuff of claim 1 wherein the flavoring compound is chosen from the group consisting of 1,1-bis(thiomethyl)nona-2,4-diene and 1,1-bis(thiomethyl)deca-2,4-diene.

* * * * *